US012255507B2

(12) United States Patent
Vartiainen et al.

(10) Patent No.: US 12,255,507 B2
(45) Date of Patent: Mar. 18, 2025

(54) ELECTRIC MACHINE ASSEMBLY AND METHOD FOR LOCKING ROTOR TO STATOR

(71) Applicant: ABB Schweiz AG, Baden (CH)

(72) Inventors: Ari Vartiainen, Helsinki (FI); Teemu Laukkanen, Helsinki (FI)

(73) Assignee: ABB Schweiz AG, Baden (CH)

( * ) Notice: Subject to any disclaimer, the term of this patent is extended or adjusted under 35 U.S.C. 154(b) by 304 days.

(21) Appl. No.: 18/057,871

(22) Filed: Nov. 22, 2022

(65) Prior Publication Data

US 2023/0163668 A1    May 25, 2023

(30) Foreign Application Priority Data

Nov. 23, 2021 (EP) .................................... 21209784

(51) Int. Cl.
*H02K 15/16* (2006.01)
*H02K 1/2713* (2022.01)
*H02K 7/04* (2006.01)
*H02K 15/165* (2025.01)

(52) U.S. Cl.
CPC ......... *H02K 15/165* (2013.01); *H02K 1/2713* (2013.01); *H02K 7/04* (2013.01); *H02K 2213/12* (2013.01)

(58) Field of Classification Search
CPC ...... H02K 15/165; H02K 1/2713; H02K 7/04; H02K 2213/12
USPC .................... 310/91, 165.18, 156.19, 156.55
See application file for complete search history.

(56) References Cited

U.S. PATENT DOCUMENTS

| | | | | |
|---|---|---|---|---|
| 11,251,667 B2 * | 2/2022 | Kurronen | ............... | H02K 1/278 |
| 2012/0049681 A1 * | 3/2012 | Hediger | ................. | H02K 15/12 |
| | | | | 310/91 |

FOREIGN PATENT DOCUMENTS

| | | | | |
|---|---|---|---|---|
| CN | 111509896 A | | 8/2020 | |
| EP | 2590301 A1 * | | 5/2013 | ........... F03D 7/0248 |
| JP | 2010017031 A * | | 1/2010 | |
| WO | 2020238265 A1 | | 12/2020 | |

OTHER PUBLICATIONS

European Search Report; Application No. 21209784.4; Completed: May 2, 2022; 1 Page.

* cited by examiner

*Primary Examiner* — Jose A Gonzalez Quinones
(74) *Attorney, Agent, or Firm* — Whitmyer IP Group LLC

(57) ABSTRACT

An electric machine assembly including a body part; a stator stationarily supported to the body part; a rotor adapted to rotate relative to the stator, and adapted to receive a shaft inside thereof; and a locking system for providing a locking state for the electric machine assembly in which the rotor is locked relative to the stator. The locking system includes at least one locking member adapted to be in a separating position between the rotor and the stator; and a plurality of radial bolt holes provided in the rotor, extending in a radial direction, and adapted to receive centring bolts such that distal ends of the centring bolts press the at least one locking member in the separating position radially outwards relative to the rotor.

16 Claims, 3 Drawing Sheets

ELECTRIC MACHINE ASSEMBLY AND METHOD FOR LOCKING ROTOR TO STATOR

TECHNICAL FIELD

The invention relates to an electric machine assembly.

BACKGROUND

A known shaft generator comprises a body part, a shaft, a stator and a rotor such that there are no bearings between the shaft and the body part. During transportation of the shaft generator, the rotor is locked relative to the stator by a locking system comprising bolts co-operating with inside threads provided in the stator of the shaft generator.

One of the disadvantages associated with the above shaft generator is that a proper centring of the rotor relative to the stator in a locking state requires precisely machined surfaces in at least one of the stator and the rotor.

SUMMARY

An object of the present invention is to provide an electric machine assembly so as to alleviate the above disadvantage. Another object of the present invention is to provide a method for locking a rotor to a stator. The objects of the invention are achieved by an electric machine assembly and a method described in the following.

The invention is based on the idea of providing an electric machine assembly with a locking system comprising at least one locking member adapted to be in a separating position between the rotor and the stator in a locking state of the electric machine assembly, wherein the locking system comprises a plurality of radial bolt holes provided in the rotor, extending in a radial direction, and adapted to receive centring bolts such that distal ends of the centring bolts press the at least one locking member in the separating position radially outwards relative to the rotor.

An advantage of the electric machine assembly of the invention is that the locking system is adjustable, and enables centring the rotor by turning at least part of the plurality of centring bolts.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
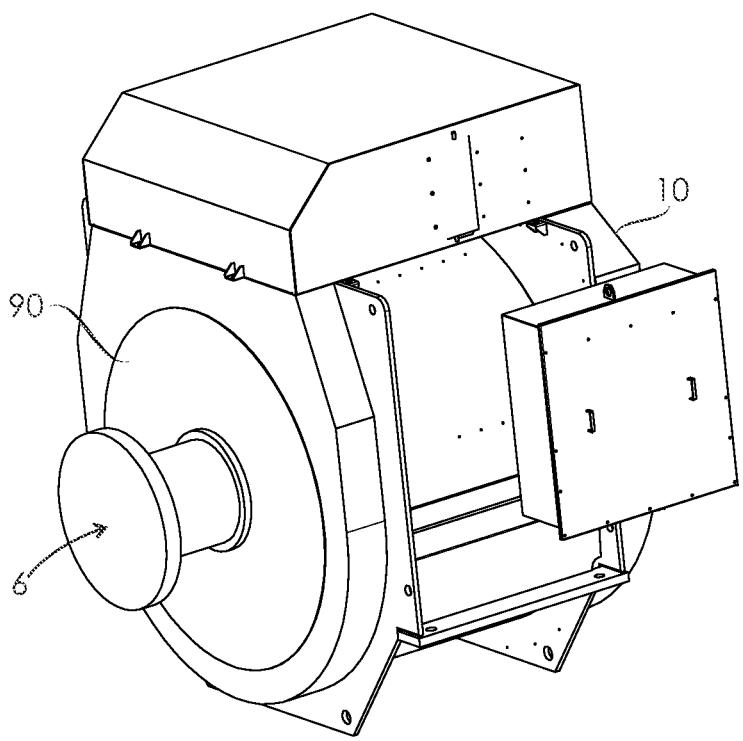
FIG. 1 shows an electric machine assembly according to an embodiment of the invention.
Figure 2:
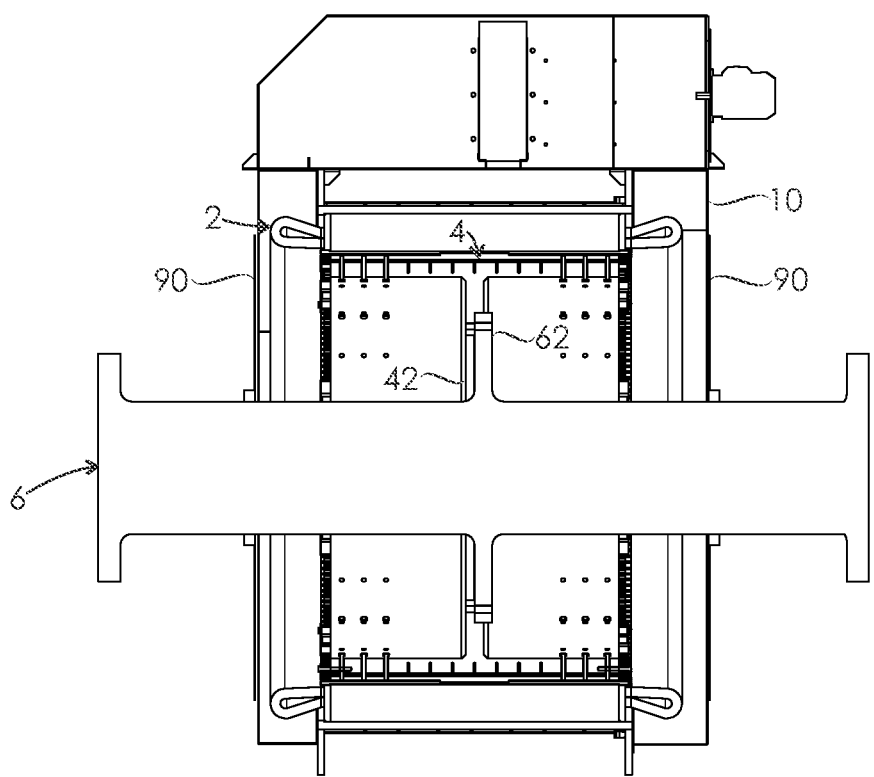
FIG. 2 shows a cross-section of the electric machine assembly shown in FIG. 1.

FIG. 1 shows an electric machine assembly, and FIG. 2 shows a cross-section of the electric machine assembly. The electric machine assembly comprises a body part 10, a stator 2, a rotor 4, a shaft 6 and end members 90. The stator 2 is stationarily supported to the body part 10. The rotor 4 is located inside the stator 2, and is adapted to rotate relative to the stator 2. The shaft 6 is received inside the rotor 4 in an operational position in which the shaft 6 is stationarily fastened to the rotor 4.

The cross section of FIG. 2 depicts the electric machine assembly from a direction perpendicular to a rotation axis of the shaft 6. FIG. 2 shows that there is a shaft flange 62 extending radially outwards from the shaft 6, and a rotor flange 42 extending radially inwards from the rotor 4. In the operational position of the shaft 6, the shaft flange 62 and the rotor flange 42 are connected to each other by a plurality of bolts.

An electric machine of the electric machine assembly shown FIG. 1 is a permanent magnet shaft electric machine capable of operating both as a generator and a motor. Herein, a shaft electric machine is an electric machine whose shaft is not supported to a body part of the electric machine. FIG. 2 shows that there are no bearings between the shaft 6 and the body part 10, and therefore the shaft 6 is unsupported relative to the body part 10.

Figure 3:
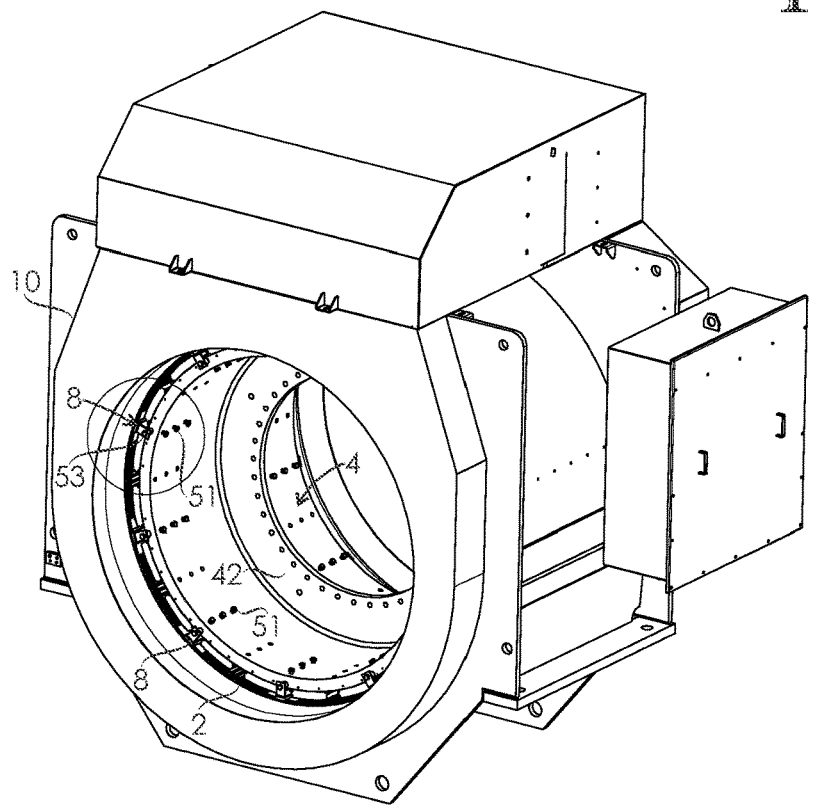
FIG. 3 shows the electric machine assembly of FIG. 1 without a shaft and end members.

In FIG. 3, the electric machine assembly of FIG. 1 is depicted without the shaft 6 and the end members 90. FIG. 3 shows that there is a locking system for providing a locking state for the electric machine assembly. In the locking state shown in FIG. 3, the rotor 4 is locked or supported relative to the stator 2 such that the rotor 4 can neither rotate relative to the stator 2 nor move axially relative to the stator 2. In an axial direction, the rotor 4 is located in the same position relative to the stator 2 as in an operational state of the electric machine. The axial direction is a direction parallel to a rotation axis of the rotor 4.

By means of the locking system, the rotor 4 is separated in a radial direction from the stator 2 such that there is no contact between the rotor 4 and the stator 2. The radial direction is perpendicular to the rotation axis of the rotor 4.

The locking system comprises a plurality of locking members 8 and a plurality of radial bolts holes provided in the rotor 4. Each of the locking members 8 is adapted to be in a separating position between the rotor 4 and the stator 2 in the locking state of the electric machine assembly. Each of the radial bolt holes extends in the radial direction, and is adapted to receive a centring bolt 51 such that a distal end of the centring bolt 51 presses a corresponding locking member 8, which is in the separating position, radially outwards relative to the rotor 4. Herein, a distal end of a bolt is an end at an opposite end of the bolt compared to a head of the bolt.

The locking state shown in FIG. 3 can be utilized during a transportation of the electric machine assembly. Additionally, the locking state can be utilized for providing an emergency disconnection of the electric machine assembly. Herein, an emergency disconnection refers to an operation in which a rotation of the rotor with respect to the stator is prevented in a situation in which the shaft is inside the rotor. An emergency disconnection may be required in case of a stator short circuit, for example.

Figure 4:
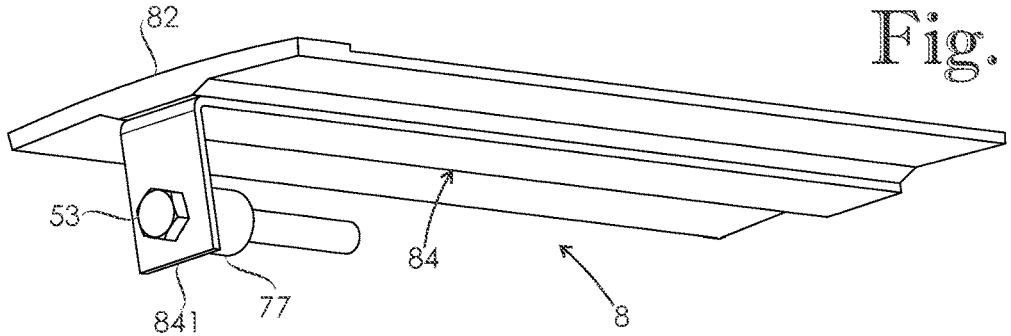
FIG. 4 shows a locking member of the electric machine assembly shown in FIG. 1.

FIG. 4 shows one locking member 8 as a separate component. The locking member 8 comprises a separation portion 82 and a securing portion 84. The separation portion 82 is adapted to extend in an air gap between the stator 2 and the rotor 4. A material of the separation portion 82 is non-magnetic and softer than materials of portions of the stator 2 and the rotor 4 which are adjacent to the separation portion 82 in the locking state for the electric machine assembly. A material of the securing portion 84 is non-magnetic and harder than material of the separation portion 82. The securing portion 84 is stationarily fastened to the separation portion 82. The securing portion 84 is adapted to be in contact with the distal end of at least one of the centring bolts 51.

In an embodiment, a material of the separation portion is a polyamide material, and a material of the securing portion is stainless steel. In another embodiment a material of the securing portion is brass.

The securing portion 84 of the locking member 8 comprises a radial member 841 extending perpendicular to the separation portion 82. The radial member 841 is adapted to extend in the radial direction in the separating position of the locking member 8. The radial member 841 is provided with a bolt hole adapted to extend in the axial direction in the separating position of the locking member 8.

Figure 5:
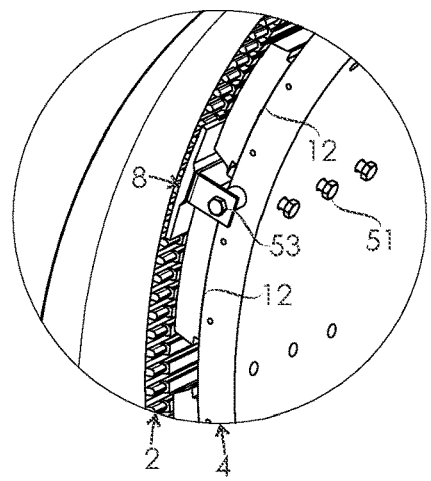
FIG. 5 shows a detail of the electric machine assembly shown in FIG. 3.

FIG. 5 shows a detail of the electric machine assembly shown in FIG. 3. FIG. 5 shows one locking member 8 in the separating position thereof. The locking member 8 is secured stationarily relative to the rotor 4 by a bolt joint comprising a fastening bolt 53 and an inner thread provided in the rotor 4. A bolt head of the fastening bolt 53 is in contact with the radial member 841 of the locking member 8 for preventing an axial movement of the locking member 8 from its separating position. There is a bushing 77 between the radial member 841 and a surface of the rotor 4, the bushing 77 is best seen in FIG. 4.

In alternative embodiments, at least one locking member comprises at least one bolt hole such that the at least one locking member is adapted to be secured stationarily relative to the rotor and/or the stator by at least one bolt joint. At least one inner thread corresponding to the at least one bolt hole is provided in the rotor, in the stator, or in the body part.

Figure 6:
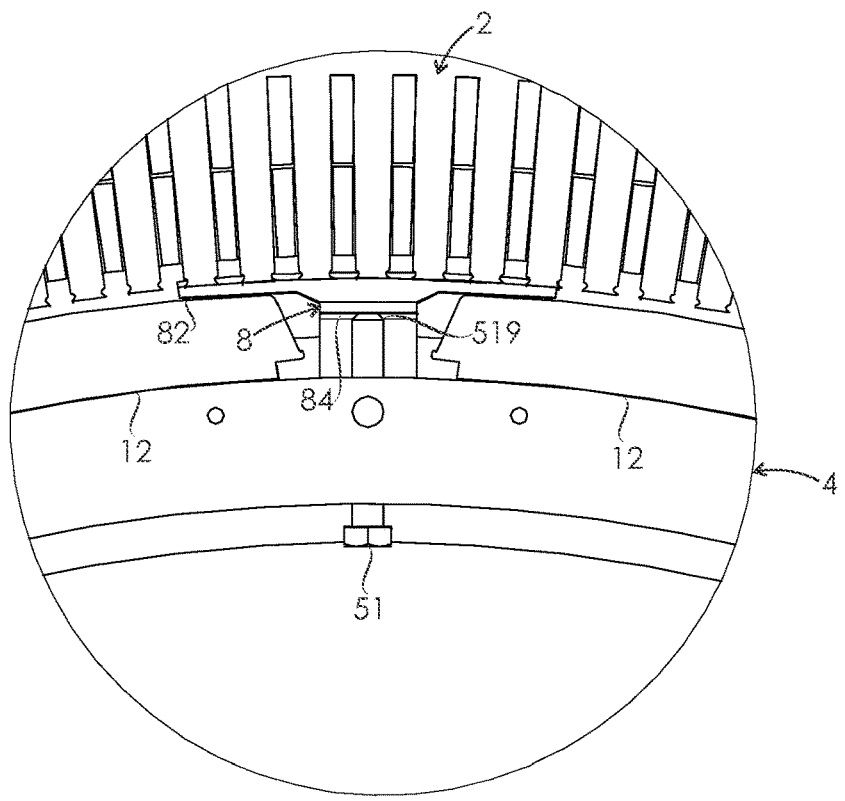
FIG. 6 shows a cross-section of a detail of the electric machine assembly shown in FIG. 1, the detail comprising a locking member in a separating position between a rotor and a stator of the electric machine assembly.

FIG. 6 shows a cross-section of a detail of the electric machine assembly shown in FIG. 1, the detail comprising a locking member 8 in a separating position between the rotor 4 and the stator 2 of the electric machine assembly. FIG. 6 illustrates how a distal end 519 of a centring bolt 51 is in contact with the locking member 8 such that the distal end 519 presses the locking member 8 radially outwards relative to the rotor 4. The distal end 519 is in contact with the securing portion 84 of the locking member 8. The separation portion 82 is in contact with a portion of the stator 2.

Figure 7:
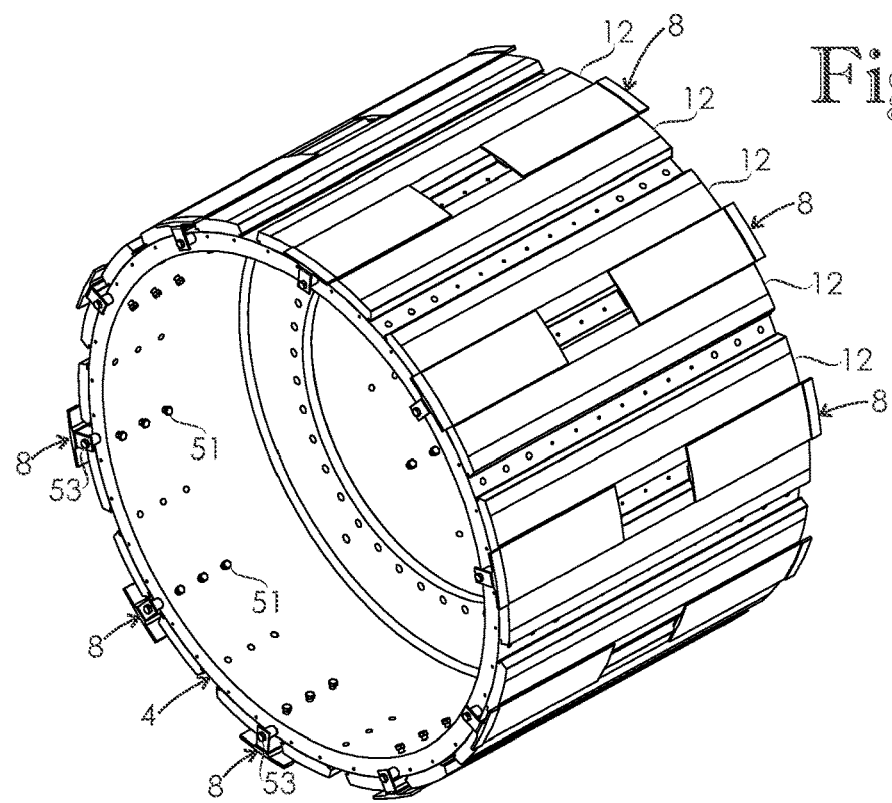
FIG. 7 shows the rotor and locking members of the electric machine assembly shown in FIG. 1.

FIG. 7 shows the rotor 4 and the locking members 8 of the electric machine assembly shown in FIG. 1. The locking members 8 are secured stationarily relative to the rotor 4 by the bolt joints comprising the fastening bolts 53. FIG. 7 shows that the locking members 8 are installed as pairs such that there are two locking members 8 in one pole clearance, and that an axial dimension of each of the two locking members 8 is less than half of an axial dimension of the rotor 4. Each locking member 8 of a locking member pair is located at a corresponding axial end of the pole clearance, and there is an empty section in the middle of the pole clearance. In an alternative embodiment, there is only one locking member per pole clearance.

In the embodiment of FIG. 7, there are twenty pole clearances in total, and every second of the pole clearances is provided with the locking member pair. In an alternative embodiment, an angular distance between adjacent locking members is smaller than in the embodiment of FIG. 7 such that each pole clearance is provided with at least one locking member. In another alternative embodiment, an angular distance between adjacent locking members is greater than in the embodiment of FIG. 7 such that less than every second pole clearance is provided with at least one locking member.

FIG. 7 shows that in a circumferential direction, the separation portions 82 of the locking member 8 cover less than one half of a circumference of the rotor 4. In an alternative embodiment, the locking system comprises only one locking member provided with an annular separation portion covering the entire circumference of the rotor.

The rotor 4 comprises twenty permanent magnets 12 and twenty pole clearances each located between adjacent permanent magnets 12. The permanent magnets 12 are best seen in FIGS. 5, 6 and 7. The radial bolt holes for the centring bolts 51 are located in the pole clearances.

A method for locking the rotor 4 to the stator 2 in order to provide the electric machine assembly of FIG. 3 comprises placing the rotor 4 inside the stator 2, placing the locking members 8 in the separating position between the rotor 4 and the stator 2, and installing the centring bolts 51 into the radial bolt holes provided in the rotor 4 such that distal ends 519 of the centring bolts 51 press the locking members 8 radially outwards relative to the rotor 4. In an embodiment, the rotor is placed inside the stator prior to placing the locking members in the separating position between the rotor and the stator. In an alternative embodiment, the locking members are placed on a surface of the rotor prior to pushing the rotor inside the stator.

In an embodiment, a centring operation is carried out after the rotor is placed inside the stator, the locking members are placed in the separating position, and the centring bolts are installed into the radial bolt holes. The centring operation comprises measuring a radial distance between the rotor and the stator at a plurality of measurement points spaced apart in the circumferential direction, determining, based on results of said measuring, whether a desired level of centring has been reached, and if the desired level of centring has not been reached, turning at least part of the centring bolts in order to improve centring of the rotor. A basic principle is that when a centring bolt is tightened, another centring bolt is loosened at an opposing side of the rotor.

Measuring the radial distance between the rotor and the stator can be realized in several ways. In an embodiment, a clearance gauge is used.

It will be obvious to a person skilled in the art that the inventive concept can be implemented in various ways. The invention and its embodiments are not limited to the examples described above but may vary within the scope of the claims.

The invention claimed is:

1. An electric machine assembly comprising:
a body part;
a stator stationarily supported to the body part;
a rotor adapted to rotate relative to the stator, and adapted to receive a shaft inside thereof in an operational position in which the shaft is stationarily fastened to the rotor; and
a locking system for providing a locking state for the electric machine assembly in which the rotor is locked relative to the stator;
wherein the locking system includes at
at least one locking member adapted to be in a separating position between the rotor and the stator in the locking state of the electric machine assembly; and
a plurality of radial bolt holes provided in the rotor, extending in a radial direction, and adapted to receive centring bolts such that distal ends of the centring bolts press the at least one locking member in the separating position radially outwards relative to the rotor.

2. The electric machine assembly according to claim 1, wherein in the operational position of the shaft, the shaft is unsupported relative to the body part.

3. The electric machine assembly according to claim 1, wherein the at least one locking member comprises a separation portion adapted to extend in an air gap between the stator and the rotor, a material of the separation portion being non-magnetic and softer than materials of portions of the stator and the rotor which are adjacent to the separation portion in the locking state for the electric machine assembly.

4. The electric machine assembly according to claim 3, wherein the at least one locking member comprises a securing portion whose material is non-magnetic and harder than material of the separation portion, the securing portion being stationarily fastened to the separation portion, and the securing portion is adapted to be in contact with the distal end of at least one of the centring bolts.

5. The electric machine assembly according to claim 4, wherein the at least one locking member comprises at least one bolt hole such that the at least one locking member is adapted to be secured stationarily relative to the rotor and/or the stator by at least one bolt joint.

6. The electric machine assembly according to claim 5, wherein at least one of the rotor, stator and body part is provided with at least one inner thread adapted to co-operate with at least one bolt extending through the at least one bolt hole of the at least one locking member such that a bolt head of the at least one bolt is adapted to co-operate with the at least one locking member for preventing an axial movement of the at least one locking member from its separating position in the locking state of the electric machine assembly.

7. The electric machine assembly according to claim 5, wherein the securing portion of the at least one locking member includes a radial member adapted to extend in the radial direction in the separating position of the at least one locking member, and the at least one bolt hole is provided in the radial member, and is adapted to extend in an axial direction in the separating position of the at least one locking member.

8. The electric machine assembly according to claim 1, wherein the electric machine assembly is a permanent magnet electric machine assembly such that the rotor includes a plurality of permanent magnets and a plurality of pole clearances each located between adjacent permanent magnets, wherein the plurality of radial bolt holes is located in the plurality of pole clearances.

9. A method for locking a rotor to a stator comprising the steps of:
providing an electric machine assembly including:
a body part,
a stator stationarily supported to the body part,
a rotor adapted to rotate relative to the stator, and adapted to receive a shaft inside thereof in an operational position in which the shaft is stationarily fastened to the rotors, and
a locking system for providing a locking state for the electric machine assembly in which the rotor is locked relative to the stator,
wherein the locking system includes
at least one locking member adapted to be in a separating position between the rotor and the stator in the locking state of the electric machine assembly, and
a plurality of radial bolt holes provided in the rotor, extending in a radial direction, and adapted to receive centring bolts such that distal ends of the centring bolts press the at least one locking member in the separating position radially outwards relative to the rotor;
placing the rotor inside the stator;
placing the at least one locking members in the separating position between the rotor and the stator; and
installing a plurality of centring bolts into the plurality of radial bolt holes provided in the rotor such that distal ends of the centring bolts press the at least one locking member radially outwards relative to the rotor.

10. The method according to claim 9, wherein the method comprises a centring operation for centring the rotor relative to the stator, the centring operation comprising:
measuring a radial distance between the rotor and the stator at a plurality of measurement points spaced apart in circumferential direction;
determining, based on results of said measuring, whether a desired level of centring has been reached; and
if the desired level of centring has not been reached, turning at least part of the plurality of centring bolts in order to improve centring of the rotor.

11. The electric machine assembly according to claim 2, wherein the at least one locking member comprises a separation portion adapted to extend in an air gap between the stator and the rotor, a material of the separation portion being non-magnetic and softer than materials of portions of the stator and the rotor which are adjacent to the separation portion in the locking state for the electric machine assembly.

12. The electric machine assembly according to claim 11, wherein the at least one locking member comprises a securing portion whose material is non-magnetic and harder than material of the separation portion, the securing portion being stationarily fastened to the separation portion, and the securing portion is adapted to be in contact with the distal end of at least one of the centring bolts.

13. The electric machine assembly according to claim 12, wherein the at least one locking member comprises at least one bolt hole such that the at least one locking member is adapted to be secured stationarily relative to the rotor and/or the stator by at least one bolt joint.

14. The electric machine assembly according to claim 13, wherein at least one of the rotor, stator and body part is provided with at least one inner thread adapted to co-operate with at least one bolt extending through the at least one bolt hole of the at least one locking member such that a bolt head of the at least one bolt is adapted to co-operate with the at least one locking member for preventing an axial movement of the at least one locking member from its separating position in the locking state of the electric machine assembly.

15. The electric machine assembly according to claim 13, wherein the securing portion of the at least one locking member includes a radial member adapted to extend in the radial direction in the separating position of the at least one locking member, and the at least one bolt hole is provided in the radial member, and is adapted to extend in an axial direction in the separating position of the at least one locking member.

16. The electric machine assembly according to claim 2, wherein the electric machine assembly is a permanent magnet electric machine assembly such that the rotor includes a plurality of permanent magnets and a plurality of pole clearances each located between adjacent permanent magnets, wherein the plurality of radial bolt holes is located in the plurality of pole clearances.

* * * * *